(12) United States Patent
O'Connor et al.

(10) Patent No.: US 10,382,628 B2
(45) Date of Patent: Aug. 13, 2019

(54) SYSTEM AND METHOD FOR ROUTING WORK REQUESTS TO A RESOURCE GROUP OF AN ENTERPRISE

(71) Applicant: Avaya Inc., Santa Clara, CA (US)

(72) Inventors: Neil O'Connor, Galway (IE); Robert C. Steiner, Westminster, CO (US); Tony McCormack, Galway (IE); John McGreevy, Galway (IE)

(73) Assignee: Avaya Inc., Santa Clara, CA (US)

( * ) Notice: Subject to any disclaimer, the term of this patent is extended or adjusted under 35 U.S.C. 154(b) by 154 days.

(21) Appl. No.: 14/294,562

(22) Filed: Jun. 3, 2014

(65) Prior Publication Data

US 2015/0350442 A1 Dec. 3, 2015

(51) Int. Cl.
*H04M 3/00* (2006.01)
*H04M 3/523* (2006.01)

(52) U.S. Cl.
CPC .... *H04M 3/5232* (2013.01); *H04M 2203/402* (2013.01)

(58) Field of Classification Search
CPC .................................................. H04M 3/5175
USPC ....... 379/265.01–265.14, 266.01–266.1, 309
See application file for complete search history.

(56) References Cited

U.S. PATENT DOCUMENTS

| | | | | |
|---|---|---|---|---|
| 4,974,256 A * | 11/1990 | Cyr | ...................... | H04M 3/365 379/112.04 |
| 5,828,747 A * | 10/1998 | Fisher | ................. | H04M 3/5233 379/265.12 |
| 6,359,982 B1 * | 3/2002 | Foster | ................. | H04M 3/5233 379/265.1 |
| 6,434,121 B1 * | 8/2002 | Davidson | ................ | H04M 3/51 370/270 |
| 6,711,253 B1 * | 3/2004 | Prabhaker | ............... | H04M 3/36 379/265.01 |
| 7,478,051 B2 * | 1/2009 | Nourbakhsh | .......... | G06Q 10/06 705/7.14 |
| 8,348,774 B2 * | 1/2013 | Takabe | ..................... | F16J 3/042 464/111 |
| 8,391,465 B1 * | 3/2013 | Porter | ................. | H04M 3/5175 379/265.05 |
| 8,634,543 B2 | 1/2014 | Flockhart et al. | | |
| 9,020,133 B2 * | 4/2015 | Desai | .................. | H04M 3/5238 379/265.06 |
| 2007/0129996 A1 * | 6/2007 | Babine | .................. | G06Q 10/06 379/265.1 |
| 2008/0004933 A1 * | 1/2008 | Gillespie | ................ | G06Q 10/06 705/7.14 |

(Continued)

*Primary Examiner* — William J Deane, Jr.

(57) ABSTRACT

A work routing system of an enterprise is disclosed for allocating resources for routing a work request in an enterprise. The work routing system includes a resource monitoring module configured to determine resource-occupancy of a plurality of resources available in the enterprise, wherein the plurality of resources are grouped into one or more groups based on a predefined strategy. The work routing system further includes a group monitoring module configured to determine group-occupancy of the one or more groups based on at least one predefined criteria, wherein the group-occupancy is determined for a predefined time period. The work routing system further includes an assignment module configured to assign the work request to one of the one or more groups based on the group-occupancy.

20 Claims, 5 Drawing Sheets

(56) References Cited

U.S. PATENT DOCUMENTS

| | | | |
|---|---|---|---|
| 2008/0144803 A1* | 6/2008 | Jaiswal | H04M 3/5233 379/265.12 |
| 2009/0210535 A1* | 8/2009 | Whitman, Jr. | G06Q 10/06311 709/226 |
| 2011/0202657 A1* | 8/2011 | Chang | G06F 9/505 709/226 |
| 2014/0169549 A1* | 6/2014 | Desai | H04M 3/5238 379/266.1 |
| 2015/0286979 A1* | 10/2015 | Ming | G06Q 10/063112 705/7.14 |

* cited by examiner

SYSTEM AND METHOD FOR ROUTING WORK REQUESTS TO A RESOURCE GROUP OF AN ENTERPRISE

BACKGROUND

Field

Embodiments of the present invention generally relate to a system and method to route work requests in an enterprise, and particularly to a system and method for routing a work request to a suitable resource group of the enterprise.

Description of Related Art

Contact centers are employed by many enterprises to service inbound and outbound contacts from customers. Contact center resources include the agents, the communication assets (e.g., number of voice trunks, number and bandwidth of video trunks, etc.), the computing resources (e.g., speeds, queue lengths, storage space) and so forth. A primary objective of the contact center management is to ultimately maximize contact center performance and profitability. An ongoing challenge in contact center administration is monitoring and optimizing contact center efficiency and capability in usage of its available resources. The contact center efficiency is generally measured by metrics such as service level agreement (SLA), match rate, and work-occupancy.

Service level is one measurement of the contact center efficiency and capability. Service level is typically determined by dividing the number of contacts accepted within the specified period by the number accepted plus the number that were not accepted, but completed in some other way (e.g., abandoned, given busy, canceled, flowed out etc.). Service level definitions may vary from one enterprise to another.

Match rate is also an indicator used in measuring the contact center efficiency and capability. Match rate is usually determined by dividing the number of contacts accepted by a primary skill level agent within a period of time by the number of contacts accepted by any agent for a queue over the same period. An agent with a primary skill level is one that typically can handle contacts of a certain nature more effectively and/or efficiently compared to an agent of lesser skill level. There are other contact center agents who may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent.

Work-occupancy is another indicator used in measuring the contact center efficiency and capability. Work-occupancy is usually determined for a group of agents available in the contact centers. The agents are mostly grouped based on their geographical locations, skills, offices, languages, work experience, and so on. Conventional technique for determining work-occupancy of a group of agents is by determining their instantaneous group-occupancy. The instantaneous group-occupancy is defined as the number of agents occupied divided by total number of resources in a group and is expressed as an instantaneous value for a given time frame. This technique does provide work-occupancy of a group for an instantaneous moment, however, fails to take into account occupancy of a group over a specific time period. Therefore, the conventional technique for determining group-occupancy is not sufficient for determining overall work-load on a group for a period of time.

For example, if a routing system of a contact center needs to apply a fair policy of routing work on its agents, then the conventional technique of determining the instantaneous group-occupancy is not reliable, as this technique determines work load on a group of agents only for a particular time instant. Thereby, assume if a group of agents have been busy all day working and get some relaxation time in the evening, then the conventional technique of determining group-occupancy will determine that the group has less work load and must be provided with more work. However, the group has been busy all day and must not be provided more work at the end of the day considering the fair policy of routing work.

There is thus a need for a system and method to provide an automated mechanism for determining work-occupancy of a group over a time period. Further, there is a need for a system and method to provide a fair policy of routing work to a group of agents based on their work-occupancy over a time period.

SUMMARY

Embodiments in accordance with the present invention provide a work routing system for routing a work request in an enterprise. The work routing system includes a resource monitoring module configured to determine resource-occupancy of a plurality of resources available in the enterprise, wherein the plurality of resources are grouped into one or more groups based on a predefined strategy. The work routing system further includes a group monitoring module configured to determine group-occupancy of the one or more groups based on at least one predefined criteria, wherein the group-occupancy is determined for a predefined time period. The work routing system further includes an assignment module configured to assign the work request to one of the one or more groups based on the group-occupancy.

Embodiments in accordance with the present invention further provide a computer-implemented method for routing a work request in an enterprise. The computer-implemented method includes determining resource-occupancy of a plurality of resources available in the enterprise, wherein the plurality of resources are grouped into one or more groups based on a predefined strategy, determining group-occupancy of the one or more groups based on at least one pre-determined criteria, wherein the group-occupancy is determined for a predefined time period, and assigning the work request to one of the one or more groups based on the group-occupancy.

Embodiments in accordance with the present invention further provide a computer-implemented method for routing a work request to a team of resources in an enterprise. The computer-implemented method includes determining work-occupancy of a plurality of teams in the enterprise based on at least one pre-determined criteria, wherein the work-occupancy is determined for a predefined time period, and assigning the work request to one of the plurality of teams based on the determined work-occupancy, wherein the work request is assigned to a team with lowest work-occupancy.

Embodiments of the present invention may provide a number of advantages depending on its particular configuration. First, embodiments of the present invention provides a mechanism whereby a work routing system of an enterprise determines work load on a team of the enterprise for a pre-determined time period, i.e., for last 4 hours, for last 5 minutes, for next 30 minutes, for next 6 hours, and so on. This mechanism enables the embodiments of the present invention to apply a fair policy of routing work to its agents by routing more work to a team having lower work load for the day.

Next, embodiments of the present invention provides a mechanism whereby the work routing system of the enterprise considers the type of work or difficulty level of work before assigning the work to a team. The work routing system is further configured to provide relaxation in work load for a team handling work of higher difficulty level in comparison to a team handling usual type of work. In addition, the work routing system further considers skill level of resources working in a team for determining difficulty level of the work being assigned to the team.

These and other advantages will be apparent from the disclosure of the embodiments described herein.

The preceding is a simplified summary to provide an understanding of some aspects of embodiments of the present invention. This summary is neither an extensive nor exhaustive overview of the present invention and its various embodiments. The summary presents selected concepts of embodiments of the present invention in a simplified form as an introduction to the more detailed description presented below. As will be appreciated, other embodiments of the present invention are possible that utilize, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

Figure 1A:
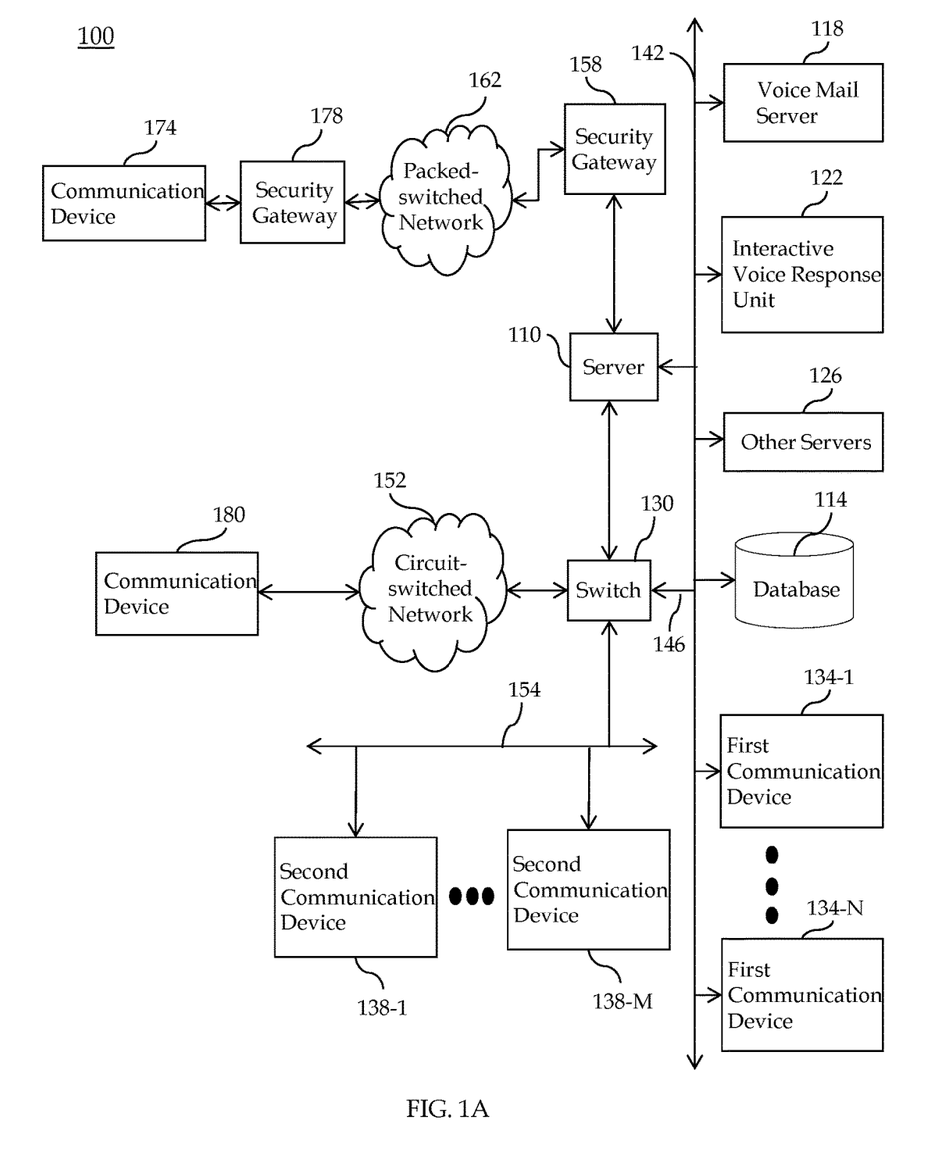
FIG. 1A illustrates a block diagram depicting a contact center according to an embodiment of the present invention.

FIG. 1A shows an illustrative embodiment of the present invention. A contact center 100 comprises a server 110, a set of data stores or database 114 containing contact or customer related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). The servers may be connected via optional communication lines 146 to the switch 130. As will be appreciated, the other servers 126 may also include a scanner (which is normally not connected to the switch 130 or a Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. The security gateway 158 may be implemented as hardware such as via an adjunct processor (as shown) or as a chip in the server.

Figure 1B:
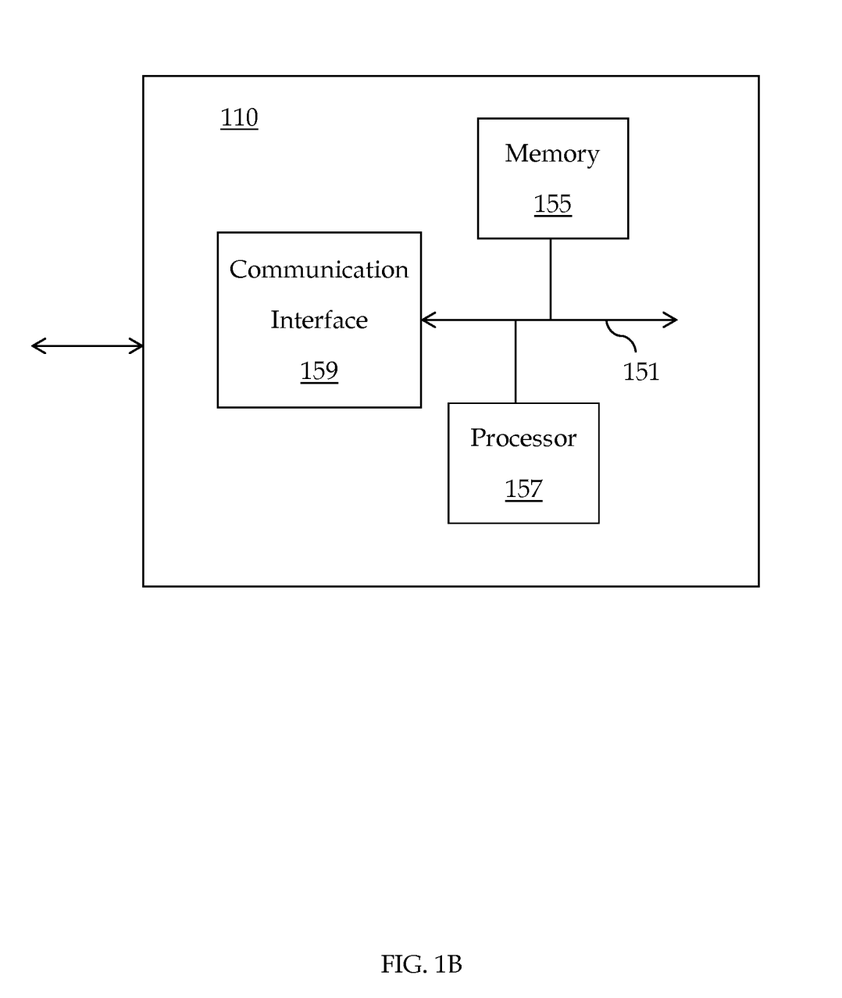
FIG. 1B illustrates at a high level of hardware abstraction a block diagram of a server.

FIG. 1B illustrates at a relatively high level of hardware abstraction a block diagram of a server such as server 110 in accordance with an embodiment of the present disclosure. Server 110 may include an internal communication interface 151 that interconnects a processor 157, a memory 155 and a communication interface circuit 159. Communication interface circuit 159 may include a receiver and transmitter to communicate with other elements of contact center 100, such as switch 130, security gateway 158, LAN 142, and so forth. By use of programming code and data stored in memory 155, processor 157 may be programmed to carry out the various functions of server 110.

Although embodiments are discussed with reference to client-server architecture, it is to be understood the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments do not require the presence of packet- or circuit-switched networks.

Figure 2:
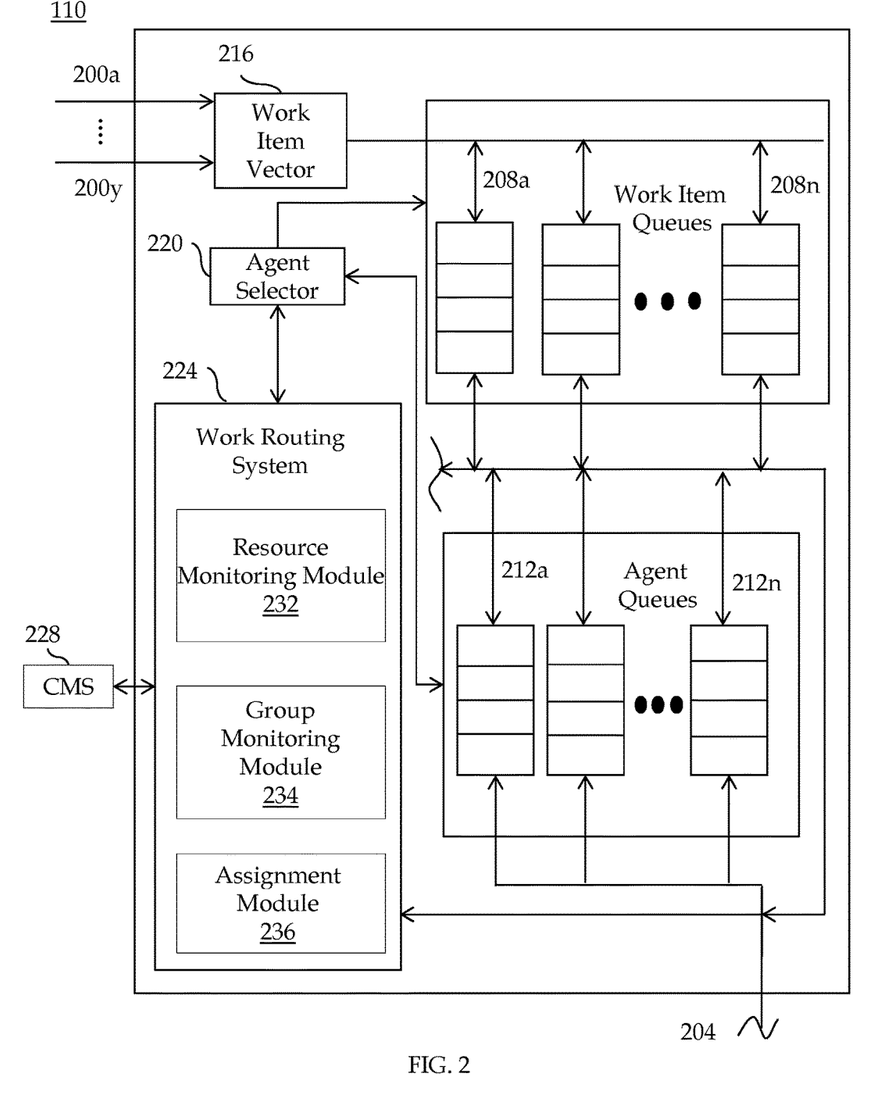
FIG. 2 illustrates a functional block diagram of a server according to an embodiment of the present invention.

Referring to FIG. 2, one possible configuration of the server 110 is depicted at a relatively high level of functional abstraction. The server 110 is in communication with a plurality of customer communication lines 200a-y (which can be one or more trunks, phone lines, etc.) and agent communication line 204 (which can be a voice-and-data transmission line such as the LAN 142 and/or a circuit switched voice line). The server 110 can include Avaya Inc.'s an Operational Analyst™ (OA) with On-Line Analytical Processing (OLAP) technology, or a Call Management System (CMS) 228 that gathers profile of agents of the contact center and monitors current status of the agents and parameters of the received work requests. OA and CMS will hereinafter be referred to jointly as CMS 228.

The switch 130 and/or server 110 may be any architecture for directing contacts to one or more communication devices. In some embodiments, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX)-based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company.

Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

As can be seen in FIG. 2, included among the data stored in the server 110 is a set of contact queues or work request queues 208a-n and a separate set of agent queues 212a-n. Each work request queue 208a-n corresponds to a different set of agent queues, as does each agent queue 212a-n. Conventionally, contacts are prioritized and either are queued in individual ones of the contact queues 208a-n in their order of priority, or are queued in different ones of a plurality of contact queues 208a-n that correspond to a different priority. Likewise, each agent's queue 212a-n are prioritized according to his or her level of expertise or skill in that queue, and agents are queued in either individual ones of agent queues 212a-n in their order of expertise level, or in different ones of a plurality of agent queues 212a-n that correspond to a queue and each one of which corresponds to a different expertise level.

Going forth in the description of the present application, it will be apparent to a person skilled in the art that though the present invention is explained with an embodiment where work assignments are queued in wait of availability of a suitable agent, the present application is also applicable to other embodiments where the work assignments do not need to be queued and at least one agent is always available for handling the work assignments. It will further be evident to a person skilled in the art that scope of the present application is not limited by a method of practically assigning a work assignment to a suitable agent. However, the present application is more focused defining a new and non-obvious method of selecting a suitable agent (for routing a work assignment) from a suitable team of agents by adhering to a fair policy of routing work assignments, where a practice is followed to assign substantially same amount of work load on all teams and their corresponding agents.

Further, as can be seen in the FIG. 2, included among the control programs in the server 110 is a work request vector 216. Contacts incoming to the contact center are assigned by the work request vector 216 to different work request queues 208a-n based upon a number of predetermined criteria, including customer identity, customer needs, contact center needs, current contact center queue lengths, customer value, and the agent skill that is required for the proper handling of the contact. Agents who are available for handling work requests are assigned to the agent queues 212a-n based upon the skills they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center is operated by a contract operator (e.g., a supervisor or a manager of the contact center), and each of the work request queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

Referring again to FIG. 1A, the first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext1-M, respectively. The second communication devices 138-1-M may include, for example, wired and wireless telephones, PDAs, H.320 videophones and conferencing units, voice messaging and response units, traditional computer telephony adjuncts, and any other communication device.

It should be noted embodiments of the invention do not require any particular type of information transport medium between switch, or server and first and second communication devices, i.e., embodiments may be implemented with any desired type of transport medium as well as combinations of different types of transport channels.

The packet-switched network 162 can be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 174 via a security gateway 178, and the circuit-switched network 152 with an external second communication device 180.

In one configuration, the server 110, packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, user communication devices, and other elements as shown in FIG. 1A is for purposes of illustration only and should not be construed as limiting embodiments of the invention to any particular arrangement of elements.

As will be appreciated, the server 110 is notified via the LAN 142 of a received work request by communications component (e.g., switch 130, fax server, email server, Web Server, and/or other servers) receiving the received work requests as shown in FIG. 1A. The received work request is held by the receiving telecommunications component until the server 110 forwards instructions to the component to forward or route the work request to a specific contact center resource, such as the IVR unit 122, the voice mail server 118, and/or first or second communication device 134-1-N, 138-1-M associated with a selected agent. The server 110 distributes and connects these work requests to telecommunication devices of available agents based on the predetermined criteria noted above. When the server 110 forwards a voice contact (or first work request) to an agent, the server 110 also forwards customer-related information from the database 114 to the agent's computer workstation for viewing (such as by a pop-up display) to permit the agent to better serve the customer of the contact center. Depending on the agent's profiles, their current working status, and parameters of the received work requests, the server 110 may assign a multichannel work request to the agents of the contact center. The agents process the received work requests or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

Referring to FIG. 2, embodiments in accordance with the present disclosure include, among the programs executing on the server 110, an agent selector 220 and a work routing system 224. The agent selector 220 and the work routing system 224 are stored either in the main memory or in a peripheral memory (e.g., disk, CD ROM, etc.) or some other computer-readable medium of the contact center. The agent selector 220 effects an assignment between available work requests (or contacts) and available agents in a way that tends to maximize contact center efficiency for the current contact center state. The agent selector 220 uses predefined criteria in selecting an appropriate agent to service the work request. The work routing system 224, in particular, obtains, for each of a plurality of contact center business goals or objectives, current status information of agents, or information respecting whether or not a corresponding metrics (for example, the service level agreement) is being met or unmet and/or a level to which the corresponding goal is being met or unmet.

For example, exemplary metrics can be expressed as actual, average or median wait times in each work request queues 208a-n, actual, average, or median agent staffing levels in each agent queue 212a-n, actual, average, or median revenue (whether gross or net) realized by a designated set of agents (such as the agents in an agent skill queue) per serviced contact, a customer satisfaction level for a set of designated agents determined during or after servicing of each customer's contact, actual, average, or median time for the agents in a set of designated agents to service contacts, number of contacts to be serviced by a set of designated agents during a selected time period, and the service level agreement between the contractor and the client. This information, along with other statistics is typically gathered by the CMS 228.

According to an embodiment of the present invention, the work routing system 224 includes a resource monitoring module 232, a group monitoring module 234, and an assignment module 236. In some embodiments, one or more of resource monitoring module 232, group monitoring module 234, and assignment module 236 may be implemented by one or more software processes running on server 110. Server 110 may implement software processes by use of processor 157 being suitably programmed by use of software instructions stored in memory 155 coupled to processor 157.

The resource monitoring module 232 is configured to collect profile and data of resources or agents/resources (hereinafter, the terms "agents" and "resources" may be used intermittently) of the contact center in an embodiment of the present invention, wherein the agent data for providing customer services is obtained by the contact center in several ways and from several sources. A primary source for collecting the agent data may be the contact center itself. However, information included in the agent data may provide a limited view of the overall characteristics of the agent, specifically the characteristics of the agent with respect to the contact center.

The agent profile may include agent's self-description, skill sets, likes, locations etc. The agent's skill sets include agent's interests, education and work histories, technical training, experience supporting a particular industry, company, or caller. The agent skill set may include hobbies, hometowns, favorite sport teams and TV shows, cultural background, and so on, to the extent that such information may be relevant to support of callers to the contact center. In an embodiment of the present invention, the agent profile may be stored and maintained in the database 114 of the contact center.

As used herein, the term "agent skill set" may refer to the set of agent data that is used by the contact center to characterize an agent. Such agent data may include biographical agent data, demographic agent data, and external or internal behavioral agent data, to name a few. The behavioral data may include the agent's history with respect to the contact center and/or any other entity or social media channel. However, the agent data is not limited in this regard and may include any other type of agent data used by the contact center to characterize or classify agents. Further, the agent data may include any other agent data collected from one or more sources external to the contact center.

Additionally, the agent profile may be raw data or processed agent data. That is, the agent data may be analyzed to characterize the agent and thereafter used to provide customized or personalized services to the customer. For example, an agent profile may be a set of values associated with an agent and a set of characteristics, where the values are selected based on the agent data obtained. However, the disclosure is not limited in this regard and any other methods for evaluating agent data to provide services that may be used without limitation.

Accordingly, in another embodiment of the present invention, a secondary source of agent data may be utilized, e.g., social media channels. For example, the contact center may be configured to access and monitor social media channels (not shown in figure) to help determined agent skills. The profile of the agent of the contact center may be updated automatically at configurable intervals. Further, the resource monitoring module 232 is further configured to collect attributes or details from the received work requests such as type of received work request i.e., whether the call made by a customer is a video call, a voice conversation, textual conversation, emails, or an instant messaging. Further, the resource monitoring module 232 is configured to extract context of the received work request based on the inputs selected by the customer in an IVR menu, in an embodiment of the present invention. For example, inputs (e.g., selected button "5" for a "health insurance policy", and "2" for "inquiry") selected by the customer in the IVR menu may generate that the customer desires to inquire about a health insurance policy.

The resource monitoring module 232 is further configured to monitor priority of the work requests in an embodiment of the present invention. For example, a video call may be given a highest priority or "rank 1", voice conversations may have "rank 2", instant messaging may be given "rank 3", emails may be given "rank 4", and so on. In another embodiment of the present invention, the resource monitoring module 232 is configured to collect customer information from the database 114 of the contact center. The customer information may include customer's name, customer's credit history, customer's priority i.e., high priority customer, and low priority customer.

The resource monitoring module 232 is further configured to monitor current status (hereinafter, referred to as "resource-occupancy") of the agents available in the contact center at the time of received work requests in an embodiment of the present invention. The resource-occupancy of the agents may include number of existing work requests being handled by the agents, number of work requests previously handled by the agents, type of work requests being handled, priority of the customers/work requests, difficulty level of the work requests etc. The monitored resource-occupancy of the agents may then be stored in the database 114 in the form of numerical or graphical representation such as a table, pie charts, bar graphs, etc. For example, agent 1 is handling a voice call of a high priority customer, have already handled three voice calls in a working day (of higher difficulty levels), and have two more pre-allocated video call requests. Such data for a specific time period (e.g., for one full working day) may constitute to the resource-occupancy of the agent 1 for the day and may be stored in the database 114 of the contact center. The database 114 of the contact center may be updated dynamically in an embodiment of the present invention.

Further, in an exemplary embodiment of the present invention, the resources/agents of the contact center may be grouped into one or more groups based on a predefined strategy. The predefined strategy may include grouping of agents based on their geographical areas, office address, skills, work experience, designation, or based on other specific requirements for handling work requests. For example, in a multinational contact center, grouping of agents may be based on their countries. Further, in a particular branch office of a contact center, the grouping of agents may be based on their skill sets (such as, sales team, technical team etc.). Therefore, in a multinational contact center, there may be more than one sales team available in different geographical area. The contact center may thus need to apply a three tier routing mechanism to rout a work request to a suitable agent. In an embodiment of the present invention, the group monitoring module 234 may be responsible for implementing the three tier routing mechanism, wherein the assignment module 236 may be responsible for executing the actual assignment of the work request based on the findings of the group monitoring module 234.

In first tear of the routing mechanism, the contact center may first need to determine a suitable type of team for handling a work request. For example, the contact center may first determine attributes of the work request to determine whether the work request is relevant for a sales team or a technical team. Thereafter, at second tier, the contact center may need to determine status of all the sales teams (assuming work request is related to sales) working for the contact center. The status of the sales teams may include their work-occupancy levels for specific time period (say for the current working day) to determine how busy are the sales teams. The contact center may then determine a sales team having comparatively lowest work-occupancy level for routing the work request (to be fair with other sales teams having comparatively higher work load). Thereafter, at third tier, the contact center may determine at least one suitable agent from the determined sales team for handling the work request. In this manner, the three tier routing mechanism may enable a contact center to route a work request to a most suitable agent considering work-occupancy levels of all resources working in the enterprise.

Further, the group monitoring module 234 is configured to analyze the data collected by the resource monitoring module 232 corresponding to the resource-occupancy of plurality of agents available in the contact center (or an enterprise). Based on the determined resource-occupancy (for a specific time period) of the plurality of agents, the group monitoring module 234 may determine group-occupancy of the one or more groups available in the enterprise for a predefined time period.

The group-occupancy of a group may include number of existing work requests being handled by the group altogether, number of work requests previously handled by the group for a pre-defined time period, type of work requests being handled, priority of the work requests, difficulty level of the work requests, etc. The monitored group-occupancy may then be stored in the database 114 in the form of numerical or graphical representation such as a table, pie charts, bar graphs etc. In an exemplary embodiment of the present invention, the group-occupancy of the one or more groups may be determined by one or more pre-defined criteria.

In an embodiment of the present invention, one of the pre-defined criteria of determining the group-occupancy of an enterprise group of resources is by determining average-group-occupancy of the group for a predefined time period. Further, the average-group-occupancy of the group is determined by calculating sum of the amount of time a resource is occupied divided by the time that resource is available to have work assigned to it which is further divided by the total number of resources in the group for a specified time frame, mathematical representation of which is illustrated as:

$$\text{Average Group Occupancy} = \frac{\sum^{Resources} \left(\frac{\text{Time Occupied}}{\text{Time Available}}\right)}{\text{Number of Resources in Group}}$$

As illustrated above, the "Time Available" may be defined as the amount of time a resource is available for a specified time range. Further, the "Time Occupied" may be defined as the time period for which a resource is/was occupied with work. For example, for two resource groups, where the average-group-occupancy is requested over a 60 minute time frame, a first resource group may be available for the 60 minutes and is occupied for only 30 minutes, wherein a second resource group may be available for 30 minutes and is occupied for 15 minutes. Herein, for both the first and the second resource groups, the average-group-occupancy would be 0.5 for the past 60 minutes.

In another embodiment of the present invention, one of the pre-defined criteria of determining the group-occupancy of an enterprise group of resources is by determining average-group-occupancy of the group for a predefined time period. Further, the weighted-group-occupancy of the group is determined by calculating sum of the amount of time a resource is occupied, multiplied by the type of work the resource have been doing during the occupied time, and further multiplied by a level of skills possessed by the resource, which is further divided by time the resource is available to have work assigned to it, mathematical representation of which is illustrated as:

$$\text{Weighted Group Occupancy} =$$
$$\sum^{Resources} \frac{(\text{Time Occupied} \times \text{Work Type} \times \text{Resource Skill})}{\text{Time}}$$

The criteria for calculating weighted-group-occupancy of a group may be preferred over calculating the average-group-occupancy where difficulty level of a work request is to be considered for calculating work-occupancy of plurality of groups. In this criterion, work request of higher difficulty level will be weighted higher than a work request of respectively lower difficulty level. Further, the difficulty level of a work request is based on skill of the resource handling the work request. This allows the work-occupancy calculation to take account of the relative difficulty or types of work place on the overall group, which can vary by aggregate services (skills) in the group, contact types handled by the group, local time of day, etc.

Further, by considering the skill levels of the resources, work-occupancy of a group can be adjusted to appear to be less occupied due to a greater skill level of the individual resources in a group. For example, a group of resources with high proficiency in sales work will take the sales work in their stride. However, another resource group, which has an average lower proficiency in sales work, needs to compensate with increased effort. Hence, in an embodiment of the present invention, a modified occupancy is optionally used. Furthermore, by adding in a weighting for skill and work type, a highly skilled resource will be considered to be less occupied than a less skilled resource working on the same type of work. Similarly, a high skilled resource working on difficult work could potentially be equally as occupied as a low skilled resource working on less difficult work. For example, a resource with a skill level of 1 working on work with a difficulty of 0.9 would be equally as occupied as a resource with a skill of 0.9 working on work with a difficulty of 1. Hence, calculation of weighted-group-occupancy over the average-group-occupancy gives a more controlled approach for allowing both the skill of an individual resource and the combined skills of a group of resources to be considered along with the type of work those resources have been allocated.

In yet another embodiment of the present invention, one of the pre-defined criteria of determining the group-occupancy of an enterprise group of resources is by determining relative-group-occupancy of the group for a predefined time period. Further, the relative-group-occupancy of the group can be calculated in two different ways. A first way is to ignore the difficulty level of work requests and calculate the relative-group-occupancy using the average-group-occupancy. A second way is to consider the difficulty level of work requests and calculate the relative-group-occupancy using weighted-group-occupancy.

In an embodiment of the present invention, where the first way of calculating the relative-group-occupancy is preferred. However, the relative-group-occupancy is determined by first calculating the average-group-occupancy and then calculating occupancy of the group for a time instance (hereinafter, referred to as "instantaneous-group-occupancy"). The instantaneous-group-occupancy of a group is defined as the number of resources occupied divided by the total number of resources in a group and is expressed as an instantaneous value for a given moment, mathematical representation of which is illustrated as:

$$\text{Instantaneous Group Occupancy} = \frac{\sum \text{Resources Occupied}}{\text{Number of Resources in Group}}$$

For example, if there are 50 agents working on calls and there are a total of 100 agents in an enterprise, then the instantaneous-group-occupancy will be 50 percent. Further, as depicted from the calculation, the instantaneous-group-occupancy does not consider difficulty level of the work requests and the skill levels of the resources. Therefore, for determining the instantaneous-group-occupancy considering the difficulty levels of the work requests (hereinafter, referred to as "weighted-instantaneous-group-occupancy") sum of the number of occupied resources is multiplied by the type of work the resource have been doing during the occupied time, and further multiplied by a level of skills possessed by the resources, which is further divided by the total number of resources available in the group, the mathematical representation of which is illustrated as:

Weighted Instantaneous Group Occupancy =

$$\frac{\sum (\text{Resources Occupied} \times \text{Work Type} \times \text{Resource Skill})}{\text{Number of Resources in Group}}$$

Further, for determining the relative-group-occupancy the calculated average-group-occupancy is multiplied by a weight factor (hereinafter, referred to as "group-occupancy-weighting" or "GOW") and is added to a product (mathematical multiplication) of the calculated instantaneous-group-occupancy with another weighting factor "1-GOW", mathematical representation of which is illustrated as:

$$\text{Relative Group Occupancy} = \left(\left(\sum\nolimits^{Resources} \frac{\text{Time Occupied}}{\text{Time Available}}\right) \times GOW\right) + \left(\left(\frac{\sum \text{Resources Occupied}}{\text{Number of Resources in Group}}\right) \times (1 - GOW)\right)$$

The concept of multiplying the average-group-occupancy and the instantaneous-group-occupancy with the weighting factors allows the result to be tilted in a particular direction based on whether or not the average-group-occupancy or the instantaneous-group-occupancy is the preferred destination for new work. Further, the weighting factors allow a user or a customer to put it in for an average group occupancy, or instantaneous, if they want to wait between one and the other. Therefore, the weighting factors are arbitrarily set between zero and one. However, the values for the weighting factors could be between any values.

In another embodiment of the present invention, the second way of calculating the relative-group-occupancy is preferred. However, the relative-group-occupancy is determined by first calculating the weighted-group-occupancy and then calculating the instantaneous-group-occupancy. Thereafter, the calculated weighted-group-occupancy is multiplied by the weight factor "GOW" and is added to a product (mathematical multiplication) of the calculated instantaneous-group-occupancy with another of the weighting factor "1-GOW", the mathematical representation of which is illustrated as:

Relative Group Occupancy =

$$\left(\left(\sum_{i=1}^{Resource\ n} \frac{\left(\sum_{i=1}^{Work\ Item\ n} (\text{Time Occupied} \times \text{Type} \times \text{Skill})\right)}{\text{Time}}\right) \times \right.$$

$$GOW + \text{Resources Occupied} \text{Number of Resources} \times 1 - GOW$$

The relative-group-occupancy is a figure used as a means to compare groups of resources for determining a suitable group to assign the work request. More specifically, the relative-group-occupancy is determined to give a figure that can be used to compare one group of resources to another to decide a suitable group for work allocation.

Further, calculation of the relative-group-occupancy for two groups may be significant if a ratio between them is calculated, which will be beneficial in determining a suitable group for work allocation. Furthermore, the ratio between the resource groups is used to allocate work requests by considering the number of resources available in a group, the time those resources have been occupied, the type of work previously allocated, the skill level of the resources available, and also uses a weighting to allow work to be allocated to resources based on whether or not the current state of occupancy or the occupancy over time is more important.

In an exemplary embodiment of the present invention, the assignment module 236 is configured to use the group-occupancy determined by the group monitoring module 234 for determining a suitable group for routing the work request. In an embodiment of the present invention, the assignment module 236 will route the work request to a group having the lowest group status (i.e., lowest relative-group-occupancy).

Further, in an exemplary embodiment of the present invention, assignment module 236 is further configured to determine at least one suitable resource from the determined group to assign the work request. In an embodiment, the assignment module 236 may use information corresponding to the attributes of the work request, profiles of the agents available in the determined group, and resource-occupancy of the agents to determine a suitable agent for allocating the work request. Therefore, the work routing system 224 of the contact center becomes able to rout a work request to a group with minimum work-occupancy for a specific time period and further to a suitable agent in the group.

Figure 3:
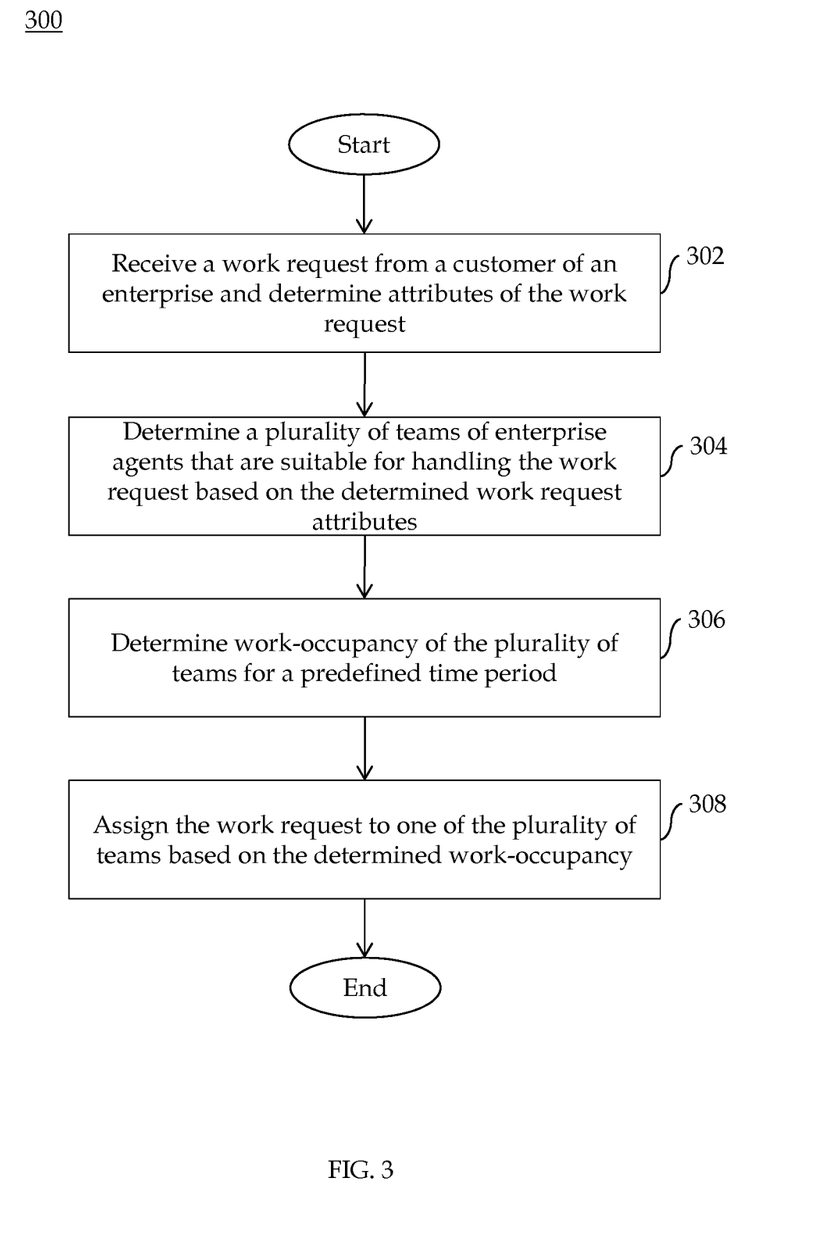
FIG. 3 depicts a flowchart of a method for routing a work request to a suitable team of resources in an enterprise, according to an exemplary embodiment of the present invention.

FIG. 3 depicts a flowchart of a method 300 for routing a work request to a suitable team of resources in an enterprise, according to an exemplary embodiment of the present invention. At step 302, a work routing system 224 (as described in FIG. 2 of the present application) receives a work request from a customer of an enterprise and determines attributes associated with the work request. The attributes of the work request may include, but not limited to, requirement of a specific language skill, requirement of a specific technical skill, requirement of specific media resources, etc.

Further, the attributes associated with the work requests may be determined by either type or context of the attributes associated with the work requests. For example, the type of received work requests may include whether the call made by a customer is a video call, a voice conversation, textual conversation, emails, or an instant messaging, etc. Further, the context of the received work request may be determined based on the inputs selected by the customer in an IVR menu, for example, inputs (e.g., selected button "5" for a "health insurance policy", and "2" for "inquiry") selected by the customer in the IVR menu may reveal the customer is inquiring about a health insurance policy.

Such attributes may either be directly retrieved from the context of the work requests, or may be retrieved from the database 114, where customer's requirements and previous communications may be pre-stored in their respective customer profiles. For example, the work routing system 224 may monitor parameters/attributes of the received work requests i.e., whether the call made by a customer is a video call, a voice conversation, a textual conversation, an email, or an instant messaging. Also, the work routing system 224 may extract context of the received work request, based on the inputs selected by the customer in an IVR menu, in an embodiment of the present invention.

At step 304, the work routing system 224 may determine total number of resource teams available in the enterprise and may further determine their skills, specialties, work experience, number of resources, etc. Thereafter, the work routing system 224 may select a plurality of teams that match with the attributes associated with the work request. For example, if a work request is related to the purchase of an item, then the work routing system 224 may search for the teams that are capable of handling sales requests. Further, if the work request is determined from a country X, then the work routing system 224 may prefer a sales team from the country X. In an embodiment of the present invention, team formation in the enterprise may be based on their geographical locations, skills, offices, languages, work experience, etc.

At step 306, the work routing system 224 may determine work-occupancy (or group-occupancy as defined in conjunction with FIG. 2 of the present application) of the determined teams for a predefined time period. The predefined time period may be any duration of time for which work-occupancy of enterprise resources is relevant for the contact center. For example, to determine efficiency of the contact center, it may be necessary to determine work-occupancy of a team from the last five hours or five minutes. This may facilitate the work routing system 224 to efficiently route new work requests to teams with lower work-occupancies for being fair with the teams that have been handling more work requests.

In an embodiment of the present application, the work-occupancy of a team is calculated by analyzing average-group-occupancy (as described earlier in conjunction with FIG. 2 of the present application) of the team for a predefined time period. In another embodiment of the present application, the work-occupancy of a team is calculated by analyzing weighted-group-occupancy (as described earlier in conjunction with FIG. 2 of the present application) of the team for a predefined time period. In yet another embodiment of the present application, the work-occupancy of a team is calculated by analyzing relative-group-occupancy (as described earlier in conjunction with FIG. 2 of the present application) of the team for a predefined time period.

At step 308, the work routing system 224 may assign the work request to one of the determined teams based on the determined work-occupancy of the teams. In an embodiment of the present invention, the work routing system 224 will route the work request to a team having lowest work-occupancy. Thereafter, the work routing system 224 may further analyze the resources/agents available in the team (with the lowest occupancy) to determine their work-occupancy levels (or resource-occupancy as described earlier in conjunction with FIG. 2 of the present application) for a predefined time. Based on the determined work-occupancy levels of the resources, the work routing system 224 may determine a resource with the lowest work-occupancy level for assigning the work request. In an exemplary embodiment of the present invention, the work routing system 224 may also consider other factors before determining a suitable agent for assigning the work requests. The other factors may include, but are not limited to, requirement of customer, skill of the resources, availability of the resources, work experience of the resources, designation of the resources, etc.

Figure 4:
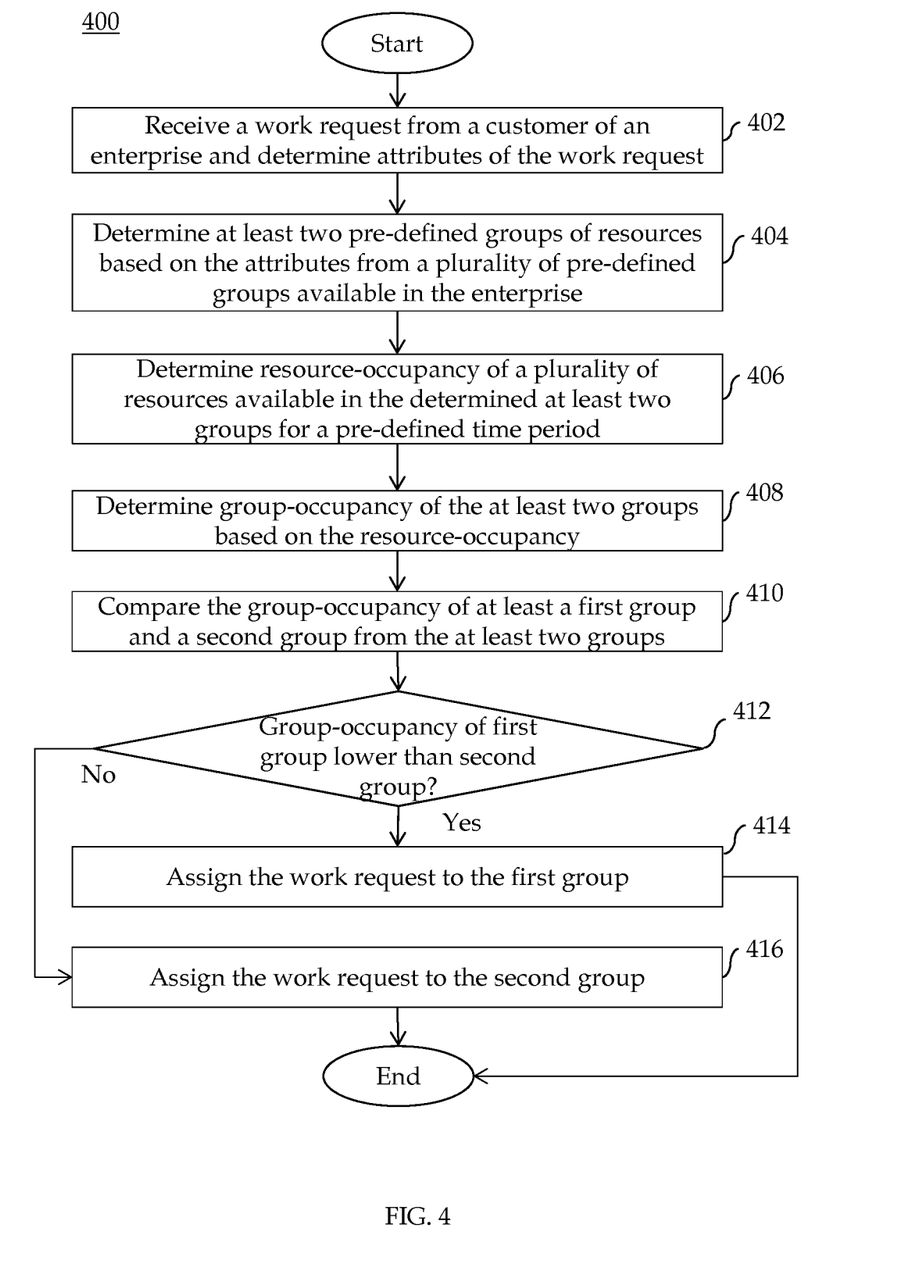
FIG. 4 depicts a flowchart of a method for routing a work request in an enterprise, according to an exemplary embodiment of the present invention.

FIG. 4 depicts a flowchart of a method 400 for routing a work request in an enterprise, according to an exemplary embodiment of the present invention. At step 402, a work routing system 224 (as described in FIG. 2 of the present application) receives a work request from one of its customers and determines attributes associated with the work request. The attributes of the work request may include, but not limited to, requirement of a specific language skill, requirement of a specific technical skill, requirement of specific media resources etc.

Further, the attributes associated with the work requests may be determined by either type or context of the attributes associated with the work requests. For example, the type of received work requests may include whether the call made by a customer is a video call, a voice conversation, textual conversation, emails, or an instant messaging, etc. Such attributes may either be directly retrieved from the context of the work requests, or may be retrieved from the database 114, where customer's requirements and previous communications may be pre-stored in their respective customer profiles. For example, the work routing system 224 may monitor parameters/attributes of the received work requests, i.e., whether the call made by a customer is a video call, a voice conversation, a textual conversation, an email, or an instant messaging. Also, the work routing system 224 may extract context of the received work request, based on the inputs selected by the customer in an IVR menu, in an embodiment of the present invention.

At step 404, the work routing system 224 may determine at least two groups (pre-defined groups) of resources in the enterprise based on the attributes associated with the work request. For example, if a work request is related to a technical query for an item, then the work routing system 224 may search for the teams that are capable of handling technical queries related to the item. In an embodiment of the present invention, formation of the resource groups in the enterprise may be based on the geographical locations, skills, offices, languages, work experience, etc. of the resources.

At step 406, the work routing system 224 may determine resource-occupancy (as defined in conjunction with FIG. 2 of the present application) of a plurality of resources available in the determined at least two groups for a pre-defined time period. The resource-occupancy is calculated by determining amount of time for which a resource was occupied and dividing it with the given pre-defined time period.

Further, at step 408, based on the determined resource-occupancy of the plurality of resources available in the determined groups, the work routing system 224 may determine group-occupancy (as defined in conjunction with FIG. 2 of the present application) of the determined at least two groups for a predefined time period. The pre-defined time period may be any duration of time for which group-occupancy of enterprise resources is relevant for the contact center. For example, to determine efficiency of the contact center, it may be necessary to determine group-occupancy of an enterprise group from last two hours or two minutes. This may facilitate the work routing system 224 to efficiently route new work requests to resource groups with lower group-occupancy for being fair with the teams who have been handling more work requests.

In an embodiment of the present application, the group-occupancy of a resource group is calculated by analyzing average-group-occupancy (as described earlier in conjunction with FIG. 2 of the present application) of the resource group for a predefined time period. In another embodiment of the present application, the group-occupancy of a resource group is calculated by analyzing weighted-group-occupancy (as described earlier in conjunction with FIG. 2 of the present application) of the resource group for a predefined time period. In yet another embodiment of the present application, the group-occupancy of a resource group is calculated by analyzing relative-group-occupancy (as described earlier in conjunction with FIG. 2 of the present application) of the resource group for a predefined time period.

At step 410, the work routing system 224 may compare the determined group-occupancy of at least a first group and a second group from the at least two groups. Thereafter, at step 412, the work routing system 224 may determine whether determined group-occupancy of the first group is lower than the second group or not. If the determined group-occupancy of the first group is lower than the second group then the method may proceed to step 414. Otherwise, the method may proceed to step 416.

At step 414, the work routing system 224 may assign the work request to the first group and then may find at least one suitable resource available in the first group for further assigning the work request. Similarly, at step 416, the work routing system 224 may assign the work request to the second group and then may find at least one suitable resource available in the second group for further assigning the work request.

In an embodiment of the present invention, the work routing system 224 may determine a suitable agent for assigning the work request based on one or more of the requirement of customers, skills of the resources, availability of the resources in the enterprise, work experience of the resources, designation of the resources, and work-occupancy of the resources over a predefined time period. In addition, the work routing system 224 may determine a suitable resource by gathering profiles of the resource and related data from the database 114 of the enterprise. The profiles may include self-description, skill sets, likes, locations, etc. related to the resources. The skill sets may further include interests, education and work histories, hobbies, hometowns, favorite sport teams and TV shows, cultural background, and so on of the resources.

In an exemplary embodiment of an assisted Contact Center service, a customer call may enter into a business process as defined by Avaya Collaboration Designer. The attributes needed to satisfy the caller are extracted as part of the customer profiling/segmentation portion of the business process. A match request is made to Avaya Work Assignment for an agent who has the desired attributes. After a period of time, the business process relaxes some of the attributes in order to meet service level. The attributes, which have been avoided, remain associated with the call. Avaya work assignment returns an agent resource that matches the relaxed set of attributes, and the caller is connected to the agent. Sometime later, the work assignment engine has an agent available with all of the originally requested attributes. A notification is sent to the business process. Based on the caller profile, the business process interrupts the in-process call and allows the more specialized agent (i.e., a more suitable agent) to greet the customer and take over the call. All context and associated data associated with the call is now accessible to the new agent.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated the various links connecting the elements can be wired or wireless links, or any combination thereof, or any other known or later developed element(s) that is/are capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as programs embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights that include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for routing a work request in an enterprise, comprising:
   a computer readable storage medium, storing executable instructions; and
   a processor in communication with the computer readable storage medium, the processor when executing the executable instructions:

determines a respective resource-occupancy of each of a plurality of resources available in the enterprise, wherein the plurality of resources are grouped into one or more groups based on a predefined strategy;

determines a respective group-occupancy of each of the one or more groups based on one or more predefined criteria, wherein the group-occupancy of a respective group is determined based on the respective resource-occupancies of the plurality of resources in that group during a predefined time period; and assigns the work request to one of the one or more groups based on the one or more respective group occupancies.

2. The system of claim 1, wherein the work request comprises one or more of a video call, voice call, email communication, web chat, or instant messaging.

3. The system of claim 1, wherein the processor, when executing the executable instructions:

determines the respective resource-occupancy of one of the plurality of resources for the predefined time period.

4. The system of claim 1, wherein determining the respective group-occupancy for a particular one of the one or more groups comprises the processor, when executing the executable instructions:

analyzing a relative-group-occupancy of the particular one group for the predefined time period.

5. The system of claim 1, wherein the processor, when executing the executable instructions:

assigns the work request to one of the one or more groups with a lowest group-occupancy.

6. The system of claim 5, wherein the processor, when executing the executable instructions:

assigns the work request to one or more resources with a lowest resource-occupancy in the one of the one or more groups with the lowest group-occupancy.

7. The system of claim 1, wherein determining the respective group-occupancy for a particular one of the one or more groups comprises the processor, when executing the executable instructions:

analyzes an average-group-occupancy of the particular one group for the predefined time period, wherein the average-group-occupancy is calculated according to:

$$\text{Average Group Occupancy} = \frac{\sum^{Resources} \frac{\text{Time Occupied}}{\text{Time Available}}}{\text{Number of Resources in Group}}$$

where $$\frac{\text{Time Occupied}}{\text{Time Available}}$$

represents a first amount of time each resource of the particular one group is occupied divided by a second amount of time that resource is available to have work assigned for the predefined time period.

8. The system of claim 1, wherein determining the respective group-occupancy for a particular one of the one or more groups comprises the processor, when executing the executable instructions:

analyzing a weighted-group-occupancy of the particular one group for a predefined time period, wherein the weighted-group-occupancy is calculated according to:

$$\sum^{Resources} \frac{(\text{Time Occupied} \times \text{Work Type} \times \text{Resource Skill})}{\text{Time Available}}$$

where Work Type represents a first weight value which depends on a work type that each resource has been working on when occupied, and Resource Skill represents a second weight value which depends on a skill level of that resource.

9. A computer-implemented method for routing a work request in an enterprise, the method comprising:

determining, by a processor, a respective resource-occupancy of each of a plurality of resources available in the enterprise, wherein the plurality of resources are grouped into one or more groups based on a predefined strategy;

determining, by the processor, a respective group-occupancy of each of the one or more groups based on one or more predefined criteria, wherein the group-occupancy of a respective group is determined based on the respective resource-occupancies of the plurality of resources in that group during a predefined time period; and assigning, by the processor, the work request to one of the one or more groups based on the one or more respective group occupancies.

10. The computer-implemented method of claim 9, wherein the work request comprises one or more of a video call, voice call, email communication, web chat, or instant messaging.

11. The computer-implemented method of claim 9, wherein determining the respective resource-occupancy of a particular one of the plurality of resources comprises:

analyzing a work-occupancy of the particular one resource for the predefined time period.

12. The computer-implemented method of claim 9, wherein determining the respective group-occupancy for a particular one of the one or more groups comprises:

analyzing a relative-group-occupancy of the particular one group for the predefined time period.

13. The computer-implemented method of claim 9, wherein assigning the work request comprises:

assigning the work request to one of the one or more groups with a lowest group-occupancy.

14. The computer-implemented method of claim 13, wherein assigning the work request further comprises:

assigning the work request to one of the plurality of resources with a lowest resource-occupancy in the one of the one or more groups group with the lowest group-occupancy.

15. The computer-implemented method of claim 9, wherein determining the respective group-occupancy for a particular one of the one or more groups comprises:

analyzing an average-group-occupancy of the particular one group for the predefined time period, wherein the average-group-occupancy is calculated according to:

$$\text{Average Group Occupancy} = \frac{\sum^{Resources} \frac{\text{Time Occupied}}{\text{Time Available}}}{\text{Number of Resources in Group}}$$

where $$\frac{\text{Time Occupied}}{\text{Time Available}}$$

represents a first amount of time each resource of the particular one group is occupied divided by a second amount of time that resource is available to have work assigned for the predefined time period.

16. The computer-implemented method of claim 9, wherein determining the respective group-occupancy for a particular one of the one or more groups comprises:

analyzing a weighted-group-occupancy of the particular one group for a predefined time period, wherein the weighted-group-occupancy is calculated according to:

$$\sum\nolimits^{Resources} \frac{(\text{Time Occupied} \times \text{Work Type} \times \text{Resource Skill})}{\text{Time Available}}$$

where Work Type represents a first weight value which depends on a work type that each resource has been working on when occupied, and Resource Skill represents a second weight value which depends on a skill level of that resource.

17. A computer-implemented method for routing a work request to a team of resources in an enterprise, the method comprising:

determining, by a processor, a respective work-occupancy of each of a plurality of teams in the enterprise based on at least one predefined criteria, wherein the work-occupancy of a respective team is determined based on a group-occupancy of that team during a predefined time period; and assigning, by a processor, the work request to one of the plurality of teams based on the determined respective work-occupancies, wherein the work request is assigned to one of the plurality of teams with a lowest respective work-occupancy.

18. The computer-implemented method of claim 17, wherein determining the respective work-occupancy of a particular one of the plurality of teams in the enterprise comprises:

analyzing an average-group-occupancy of the particular one team for the predefined time period.

19. The computer-implemented method of claim 17, wherein determining the respective work-occupancy of a particular one of the plurality of teams in the enterprise comprises:

analyzing a weighted-group-occupancy of the particular one team for the predefined time period.

20. The computer-implemented method of claim 17, wherein determining the respective work-occupancy of a particular one of the plurality of teams in the enterprise comprises:

analyzing a relative-group-occupancy of the particular one team for the predefined time period.

* * * * *

UNITED STATES PATENT AND TRADEMARK OFFICE
CERTIFICATE OF CORRECTION

PATENT NO. : 10,382,628 B2
APPLICATION NO. : 14/294562
DATED : August 13, 2019
INVENTOR(S) : O'Connor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 818 days.

Signed and Sealed this
Thirty-first Day of December, 2019

Andrei Iancu
*Director of the United States Patent and Trademark Office*